(12) United States Patent
Gaston

(10) Patent No.: US 12,227,364 B2
(45) Date of Patent: Feb. 18, 2025

(54) SCREW CONVEYOR SHAFT SEAL AND RELATED METHODS

(71) Applicant: Bridgestone Corporation, Chuo-ku (JP)

(72) Inventor: Scott E. Gaston, Phoenix, AZ (US)

(73) Assignee: Bridgestone Corporation, Chuo-ku (JP)

( * ) Notice: Subject to any disclaimer, the term of this patent is extended or adjusted under 35 U.S.C. 154(b) by 125 days.

(21) Appl. No.: 17/922,357

(22) PCT Filed: Apr. 30, 2021

(86) PCT No.: PCT/US2021/030052
§ 371 (c)(1),
(2) Date: Oct. 29, 2022

(87) PCT Pub. No.: WO2021/222680
PCT Pub. Date: Nov. 4, 2021

(65) Prior Publication Data
US 2023/0174313 A1    Jun. 8, 2023

Related U.S. Application Data

(60) Provisional application No. 63/018,050, filed on Apr. 30, 2020.

(51) Int. Cl.
*F16J 15/24* (2006.01)
*B65G 33/24* (2006.01)
*F16J 15/26* (2006.01)

(52) U.S. Cl.
CPC .............. *B65G 33/24* (2013.01); *F16J 15/24* (2013.01); *F16J 15/26* (2013.01)

(58) Field of Classification Search
CPC .. F16J 15/26; F16J 15/24; F16J 15/184; F16J 15/18
See application file for complete search history.

(56) References Cited

U.S. PATENT DOCUMENTS 1,528,721 A * 3/1925 Yeip .......................... F16J 15/18
277/510
2,567,479 A * 9/1951 Hebard .................... E21B 33/08
277/504
2,833,572 A * 5/1958 Moseley ................ F16J 15/184
277/517

(Continued)

FOREIGN PATENT DOCUMENTS

JP        H08159289 A    6/1996
JP        2016190742 A   11/2016
WO    WO-2018044459 A1    3/2018

*Primary Examiner* — Vishal A Patel
(74) *Attorney, Agent, or Firm* — Meredith E. Hooker; Matthew P. Dugan

(57) ABSTRACT

The present disclosure provides a shaft seal for a screw conveyor. The shaft seal includes a housing that includes an outboard frame plate and an inboard frame plate. The shaft seal also includes an outboard compression plate and an inboard compression plate situated between the outboard frame plate and the inboard frame plate. A least three sealing devices are situated between the outboard compression plate and the inboard compression plate with an annular recess at least partially formed along at least one of the inboard compression plate and the outboard compression plate.

20 Claims, 4 Drawing Sheets

(56) References Cited

U.S. PATENT DOCUMENTS

| | | | | |
|---|---|---|---|---|
| 4,717,160 A | * | 1/1988 | Zitting | F16J 15/184 |
| | | | | 277/584 |
| 5,246,067 A | * | 9/1993 | Heinonen | E21B 33/08 |
| | | | | 73/40 |
| 5,636,688 A | * | 6/1997 | Bassinger | F04B 53/164 |
| | | | | 277/516 |
| 6,375,196 B1 | * | 4/2002 | Phillips | F16J 15/3204 |
| | | | | 277/390 |

* cited by examiner

SCREW CONVEYOR SHAFT SEAL AND RELATED METHODS

This application is the National Stage of International Application No. PCT/US2021/030052, filed on Apr. 30, 2021, which claims the benefit of priority from U.S. Provisional Patent Application No. 63/018,050, filed on Apr. 30, 2020, the entire contents of which is hereby incorporated herein by reference.

FIELD OF THE DISCLOSURE

The present disclosure relates, generally, to shaft seals, in particular, to plate-type shaft seals for use in a screw conveyor assembly.

BACKGROUND OF THE DISCLOSURE

Screw conveyors are used in many bulk handling industries in order to move liquid or dry or saturated granular materials from a first position to a second position. In general, screw conveyors may comprise a rotatable shaft configured to be driven by a motor to rotate the shaft in a desired direction. The shaft may include a helical screw blade which wraps around a radially outer surface of the shaft. As the shaft and helical screw blade rotate in a given direction, the liquid or granular material may be propelled toward the second position based on the geometry of the helical screw blade.

Commonly, screw conveyors are positioned at a slight incline in order to move the liquid or granular materials from a first elevation to a second elevation that is at least slightly higher than the first elevation. However, because of the incline, liquids (either alone or resulting from excess liquids in saturated granular materials) may tend to accumulate in the portion of the screw conveyor proximate to the motor. As the shaft continues to rotate, this liquid may leak outside of a main housing of the screw conveyor into the external environment or into operational equipment, thereby reducing performance of the screw conveyor and/or increasing the need for maintenance and/or repair. Accordingly, one or more seal assemblies may be included in the screw conveyor assembly to limit leakage. One such assembly, commonly known as a plate assembly, may be used to limit leakage, however, in certain circumstances may be ineffective due to the limited number of sealing surfaces and or configurations of such sealing surfaces. Moreover, certain components of such plate seals may be prone corrosion when coming into contact with certain liquids, thereby leading to premature failure.

SUMMARY OF THE DISCLOSURE

One example of a shaft seal for a screw conveyor can include a housing including an outboard frame plate and an inboard frame plate. An outboard compression plate and an inboard compression plate can be situated between the outboard frame plate and the inboard frame plate. At least three sealing devices can be situated between the outboard compression plate and the inboard compression plate with an annular groove formed on or along an inboard face of the inboard compression plate.

In various embodiments, the outboard compression plate and the inboard compression plate can be formed from a non-corrosive material. The shaft seal may further include a wear plate inboard of the inboard compression plate. The wear plate can be configured to limit wear of the inboard frame plate. The shaft seal can further include a wear pin extending outboard from an inner surface of the inboard frame plate and extending into a wear pin aperture formed in the wear plate. The wear pin aperture can be formed through an outer diameter of the wear plate. The annular groove can be configured to contain a sealing ring configured to form a seal with a shaft extending through the shaft seal.

One example of a screw conveyor can include a shaft seal with a housing that includes an outboard frame plate and an inboard frame plate. An outboard compression plate and an inboard compression plate can be situated between the outboard frame plate and the inboard frame plate. At least three sealing devices can be situated between the outboard compression plate and the inboard compression plate, and an annular groove can be formed on or along an inboard face of the inboard compression plate.

In various embodiments, the outboard compression plate and the inboard compression plate can be formed from a non-corrosive material. The screw conveyor can further include a wear plate inboard of the inboard compression plate. The wear plate can be configured to limit wear of the inboard frame plate. The screw conveyor can further include a wear pin extending outboard from an inner surface of the inboard frame plate and extending into a wear pin aperture formed in the wear plate. The wear pin aperture may be formed through an outer diameter of the wear plate. The annular groove can be configured to contain a sealing ring that is configured to form a seal with a shaft extending through the shaft seal. The inboard compression plate and/or the outboard compression plate can include a recess configured to contain the at least three sealing devices. The shaft seal may be coupled to a backplate via a plurality of fasteners.

One example of a method of assembling a shaft seal can include providing an inboard compression plate, an inboard compression plate sealing ring, an outboard compression plate, an outboard compression plate sealing ring, and at least three sealing devices. The method can also include coupling the inboard compression plate sealing ring to an inboard face of the inboard compression plate, and coupling the outboard compression plate sealing ring to an outboard face of the outboard compression plate. The method can further include compressing the at least three sealing devices between the inboard compression plate and the outboard compression plate.

In various embodiments, the inboard compression plate sealing ring, the outboard compression plate sealing ring, and the at least three sealing devices may be configured to form a seal with a radially outer surface of a shaft. The inboard compression plate and the outboard compression plate can be formed from a non-corrosive material. The method can further include coupling a wear plate to the inboard face of the inboard compression plate. The method can also include inserting a wear pin into a wear pin aperture formed in the wear plate. The method can further include enclosing the inboard compression plate, the outboard compression plate, and the wear plate within a housing formed by an inboard frame plate and an outboard frame plate.

The foregoing features and devices may be combined in various combinations without exclusivity, unless expressly indicated otherwise. These features and devices as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The above and other features, examples and advantages of aspects or examples of the present disclosure are better understood when the following detailed description is read with reference to the accompanying drawings, in which.

DETAILED DESCRIPTION

Figure 1:
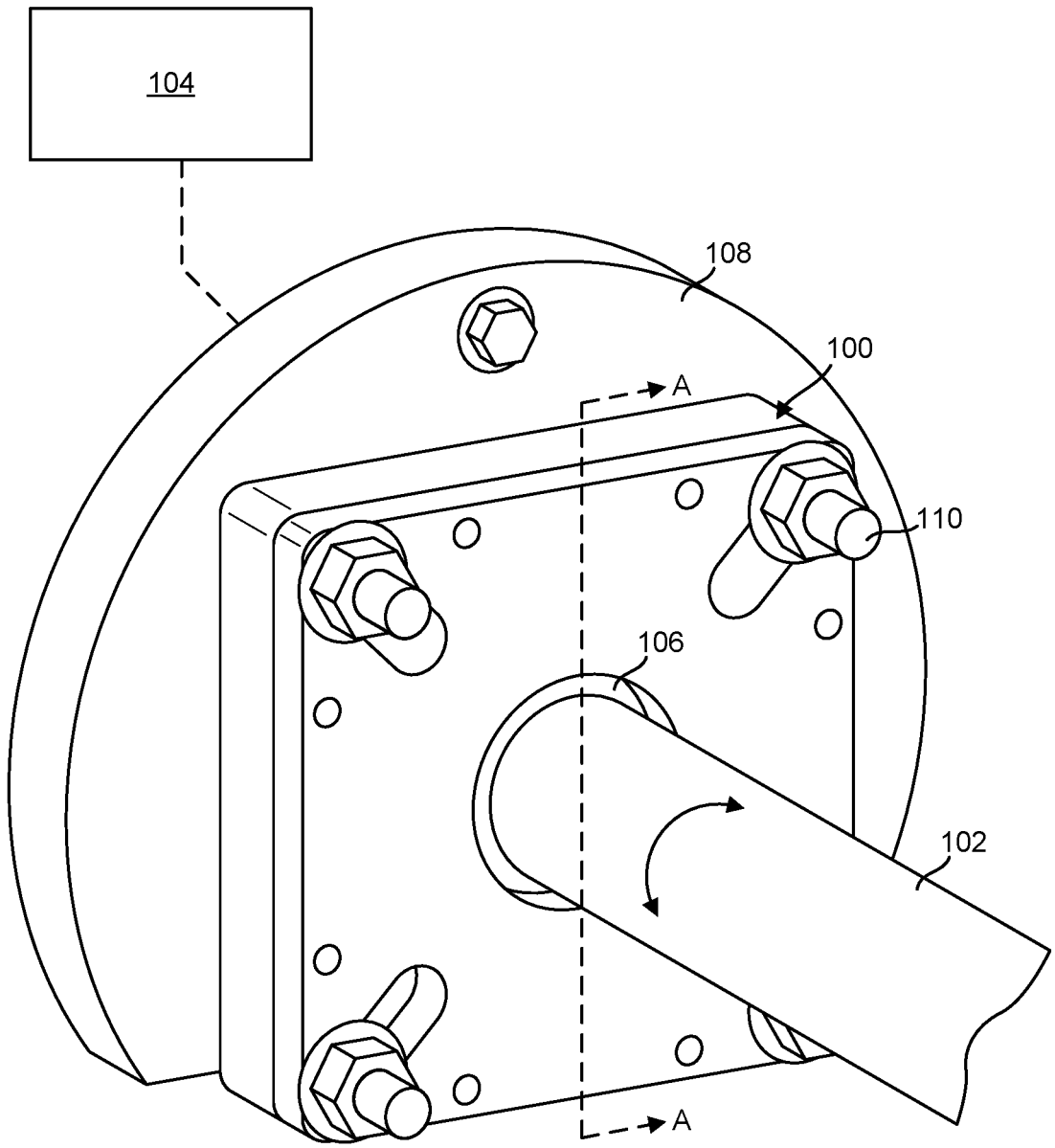
FIG. 1 is a diagram illustrating a perspective view of a shaft seal coupled to a shaft of a screw conveyor in accordance with various embodiments of the present disclosure.

Turning now to the drawings, it is to be understood that the showings are for purposes of illustrating examples of the subject matter of the present disclosure and that the same are not intended to be limiting. Additionally, it will be appreciated that the drawings are not to scale and that portions of certain features and/or devices may be exaggerated for purpose of clarity and/or ease of understanding.

The present disclosure refers to and describes shaft seal systems and methods of assembling shaft seal systems. It should be appreciated that the broader process steps described herein may be accomplished by a variety of equipment configurations and sub-process steps, each of which are within the scope of the present invention. For example, the following disclosure describes shaft seals for screw conveyors for use in guayule processing. However, the shaft seal systems disclosed herein may be used in connection with devices other than screw conveyors or may be used with screw conveyors used in connection with applications other than guayule processing.

In accordance with various embodiments of the present disclosure, a shaft seal is disclosed herein which may increase the lifespan of the shaft seal and increase sealing effectiveness of the shaft seal. Certain components of the shaft seal may be formed from corrosion-resistant materials such that the components of the shaft seal do not react with a liquid (for example, solvents such as acetone or hexane) existing in an assembly the shaft seal is coupled to (for example, a screw conveyor), thereby extending the life of the shaft seal. Further, the shaft seal disclosed herein may have an increased number of sealing surface as opposed to typical shaft seals. As a result, in the event one or more sealing surfaces degrade, redundant sealing surfaces may ensure the shaft seal continues to operate as intended.

For example, in accordance with various embodiments of the present disclosure, a shaft seal may include multiple sealing devices configured to be compressed in an axial direction. As the sealing devices are compressed (for example, as will be discussed in further detail below, by an inboard compression plate and an outboard compression plate), the sealing devices may expand in a radial direction (inward and outward) thereby forming an equal number of sealing surfaces with the shaft extending through the sealing devices. Further, the shaft seal described herein may include one or more sealing rings axially aft and axially forward of the multiple sealing devices. The sealing rings may form additional sealing surfaces with the shaft. Therefore, the multiple sealing devices and sealing rings may provide redundant sealing surfaces in the event one or more of the sealing devices and/or sealing rings experience reduced performance.

While the shaft seal herein is described with reference to a particular structure, it should be appreciated that the sealing benefits discussed herein are not limited to those particular structures. For example, the sealing devices described herein may be compressed by components having a structure different than the compression plates described below. Generally, any structure capable of compressing the sealing devices to form sealing surfaces with the shaft, while also providing redundant sealing surfaces, is contemplated by this disclosure.

Accordingly, with initial reference to FIG. 1, a shaft seal 100 is illustrated in a perspective view coupled to a shaft 102 in accordance with various embodiments. Shaft 102 may be a rotatable shaft of a screw conveyor or other bulk handling device, for example. As shown in FIG. 1, shaft seal 100 and shaft 102 are illustrated with an outer casing removed, however, it should be appreciated that shaft seal 100 and/or shaft 102 may be encased by an outer casing configured to contain a liquid or granular material between the outer casing and the shaft 102, whereby shaft 102 may rotate and move the liquid or granular material from a first position to a second position. While screw conveyors or other bulk handling devices are not discussed in detail herein, it should be understood that shaft seal 100 may be used in connection with any device requiring a sealing surface between a rotating shaft and an external environment.

Shaft seal 100 can include a plate-type shaft seal configured to prevent liquid (e.g., a solvent such as acetone or hexane) from leaking into an external environment or onto nearby operating equipment. In general, shaft seal 100 may be situated between a motor 104 and shaft 102. As non-limiting examples, motor 104 can represent an electric motor, such as a direct current (DC) motor, alternating current (AC) motor, or any other motor system capable of causing rotation of shaft 102. Shaft 102 may extend through a shaft aperture 106 formed in shaft seal 100 and couple to motor 104. Shaft seal 100 may prevent liquid from escaping between shaft aperture 106 and shaft 102 as the shaft rotates. More specifically, as will be discussed in further detail below, shaft seal 100 may comprise multiple sealing surfaces with shaft 102 such that a watertight connection exists between shaft 102 and shaft seal 100. Shaft seal 100 may be coupled to a backplate 108 of a screw conveyor or other bulk handing assembly via a plurality of fasteners 110 extending through shaft seal 100 as will be discussed in further detail below. While illustrated herein as being coupled to backplate 108 via fasteners 110, shaft seal 100 is not limited in this regard and may be coupled to backplate 108 in other ways, for example, welding, adhesives, brazing or other processes.

Figure 2:
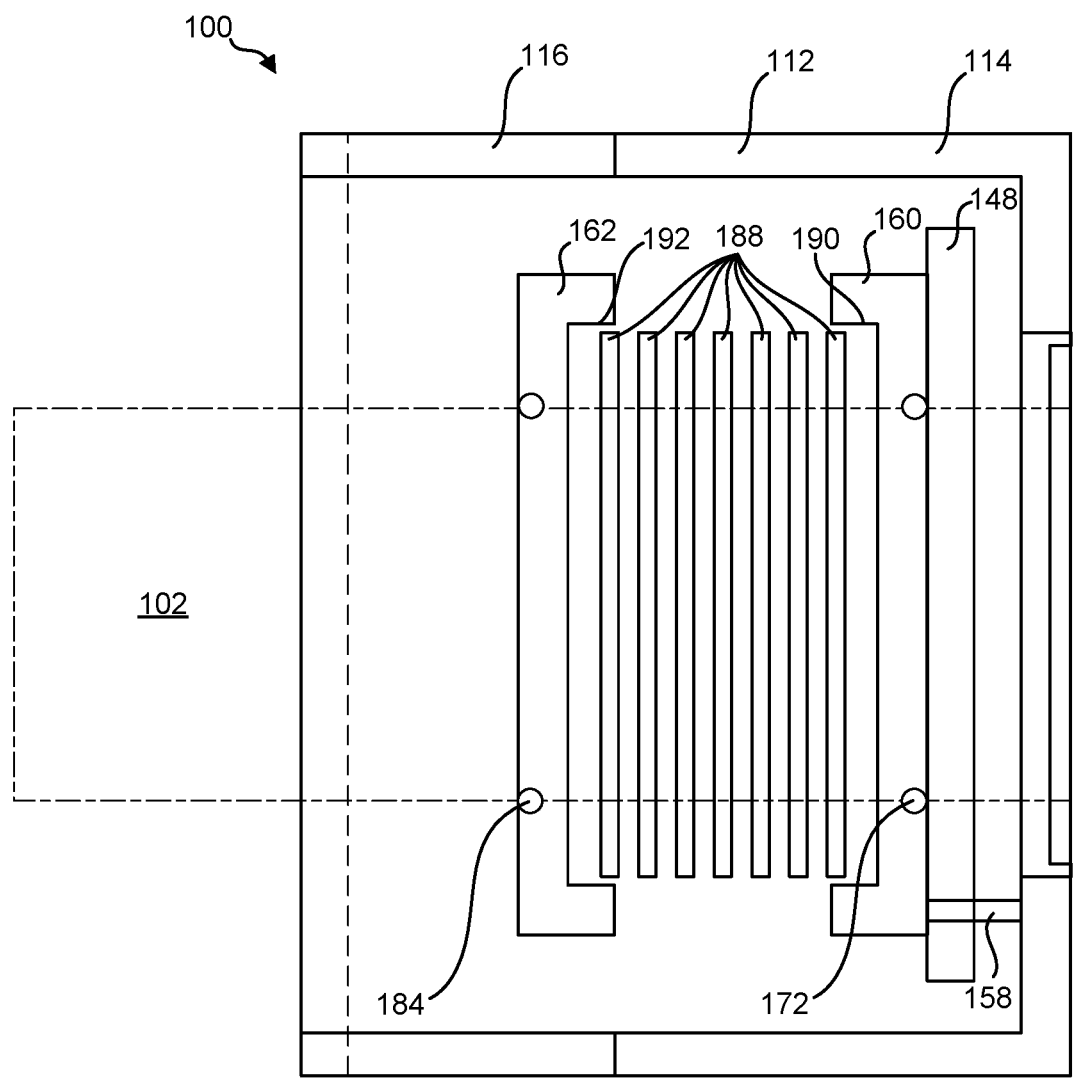
FIG. 2 is a diagram illustrating a cross-sectional view of a shaft seal in accordance with various embodiments of the present disclosure.
Figure 3:
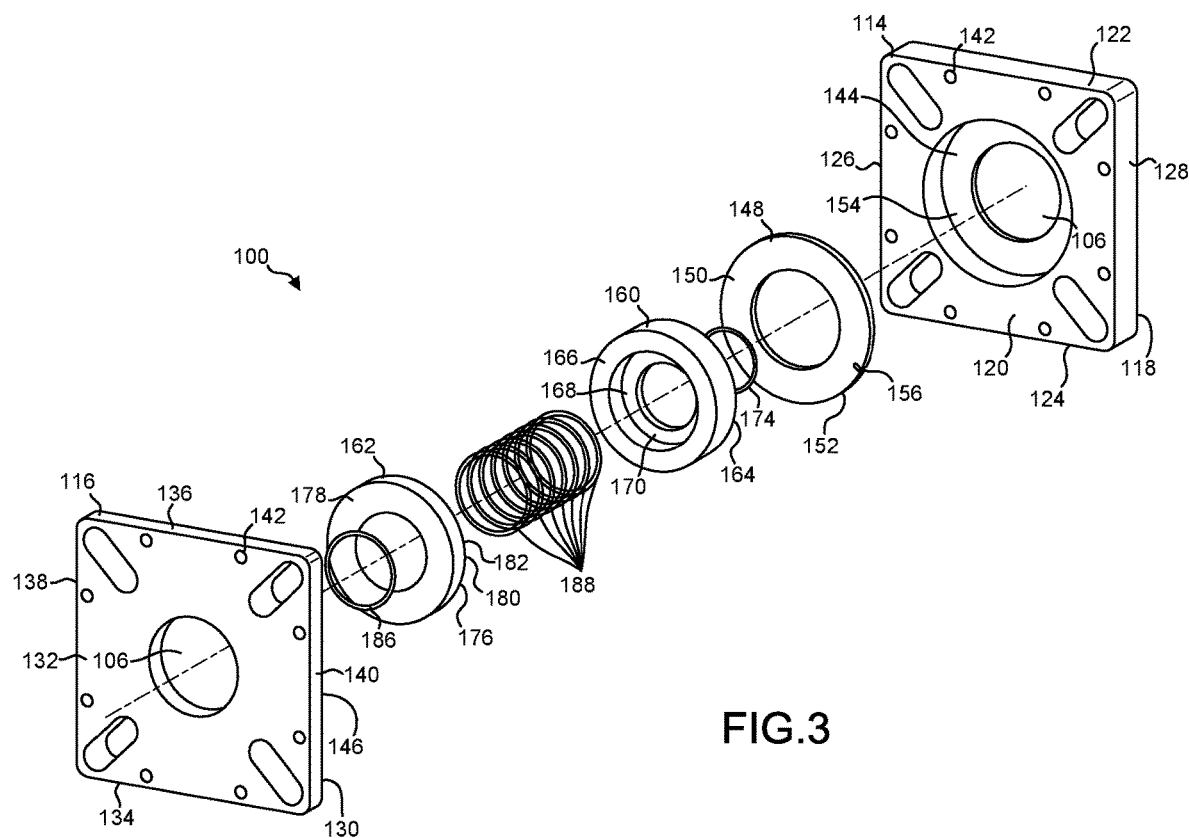
FIG. 3 is a diagram illustrating an exploded view of a shaft seal in accordance with various embodiments of the present disclosure; and, FIG. 4 is a diagram illustrating a method of assembling a shaft seal in accordance with various embodiments of the present disclosure.

With reference to FIGS. 2 and 3, shaft seal 100 is illustrated in a cross-sectional view (line A-A of FIG. 1) and an exploded view, respectively, in accordance with various embodiments. In general, shaft seal 100 may comprise a layered assembly of plate components situated within a housing 112 that can include an inboard frame plate 114 and an outboard frame plate 116 opposite inboard frame plate 114. As referred to herein, inboard may refer to a direction closest to the motor and backplate, while outboard may refer to a direction away from the motor or backplate. While illustrated herein as including a square outer profile, inboard frame plate 114 and outboard frame plate 116 are not limited in this regard and can include any suitable profile, for example, circular, ovoid, triangular, or other shape.

Inboard frame plate 114 can include an inboard face 118, an outboard face 120 opposite inboard face 118, a top surface 122, a bottom surface 124, a first side surface 126, and a second side surface 128 opposite first side surface 126. Inboard face 118 is opposite outboard face 120. Inboard face 118 may be configured to be coupled to the backplate (as shown in FIG. 1), while outboard face 120 may be configured to mate with a face of outboard frame plate 116. For example, similar to inboard frame plate 114, outboard frame plate 116 may comprise an inboard face 130, an outboard face 132, a bottom surface 134, a top surface 136, a first side surface 138 and a second side surface 140 opposite first side surface 138. Inboard face 130 of outboard frame plate 116 may be configured to mate with outboard face 120 of inboard frame plate 114. Inboard frame plate 114 and/or outboard frame plate 116 can include a plurality of apertures 142 configured to receive a corresponding number of fasteners to couple together inboard frame plate 114 and outboard frame plate 116 to form housing 112.

In various embodiments, inboard frame plate 114 may comprise a recess 144 extending in an inboard direction from outboard face 120. Recess 144 may be milled, cut, ground, drilled, pressed, or otherwise formed into inboard frame plate 114. Recess 144 may be configured to receive one or more plate components and compress the plate components between inboard frame plate 114 and outboard frame plate 116 as further described below. Similarly, outboard frame plate 116 can include a recess 146 extending in an outboard direction from inboard face 130 of outboard frame plate 116. Recess 146 may be milled, cut, ground, drilled, pressed, or otherwise formed into outboard frame plate 116. In various embodiments, inboard frame plate 114 and/or outboard frame plate 116 (or housing 112) can be at least partially formed from any suitable material or combination of materials. For example, inboard frame plate 114 and outboard frame plate 116 can be at least partially formed from hardened aluminum alloys or other low weight, high strength materials. Shaft aperture 106 may extend completely through a center of inboard frame plate 114 and outboard frame plate 116. Shaft aperture 106 may have a diameter within a range of from approximately 1 inch to approximately 3 inches, more preferably within a range of from approximately 1½ inches to approximately 2½ inches, or even more preferably approximately 2 1/16 inches.

In general, the dimensions of housing 112 fully assembled may vary depending on a given application or assembly shaft seal 100 is configured to be used with. However, in an exemplary embodiment, housing 112 may have a thickness measured from outboard face 132 of outboard frame plate 116 to an inboard face 118 of inboard frame plate 114 within a range of from approximately 0 to approximately 3 inches, more preferably within a range of from approximately 0½ inches to 2½ inches, or even more preferably approximately 1½ inches. Top surface 122, bottom surface 124, first side surface 126, and second side surface 128 may have a length within a range of from approximately 3 inches to approximately 10 inches, more preferably within a range of from approximately 4½ to 8½ inches, or even more preferably approximately 6½ inches. In an exemplary embodiment, recess 144 may be a distance within a range of from approximately 0½ inches to 1½ inches from outboard face 120, or more preferably approximately 1⅛ inches. Recess 144 may have a diameter within a range of from approximately 2 inches to approximately 6 inches, more preferably within a range of from approximately 3 inches to approximately 5 inches, or even more preferably approximately 4⅛ inches. In an exemplary embodiment, recess 146 may be between within a range of from approximately 0½ inches to approximately 1½ inches from inboard face 130, or more preferably approximately 1⅛ inches. Recess 146 can have a diameter within a range of from approximately 2 inches to 6 inches, more preferably within a range of from approximately 3 inches to approximately 5 inches, or even more preferably approximately 4⅛ inches.

With continued reference to FIGS. 2 and 3, shaft seal 100 can further include a wear plate 148 that can include a substantially annular element. Wear plate 148 may be configured to shield inboard frame plate 114 from damage resulting from rotational friction between inboard frame plate 114 and other rotating components. Wear plate 148 can be at least partially formed from a metal alloy, for example, an aluminum, steel, titanium, or other alloy. Wear plate 148 can include an outboard face 150 and an inboard face 152 opposite outboard face 150. Inboard face 152 may be configured to mate with a recess face 154 of inboard frame plate 114. Wear plate 148 can include a wear pin aperture or slot 156 formed in an outer circumference of wear plate 148. A wear pin 158 coupled to inboard frame plate 114 may extend through wear pin slot 156, such as to prevent rotational movement of wear plate 148. Shaft aperture 106 may extend completely through a center of wear plate 148. While illustrated as including only one wear plate, shaft seal 100 is not limited in this regard and may comprise other wear plates situated between other components of shaft seal 100.

Shaft seal 100 can further include an inboard compression plate 160 and an outboard compression plate 162. Inboard compression plate 160 and outboard compression plate 162 may be configured to compress one or more sealing devices between the inboard and outboard compression plates. As inboard compression plate 160 and outboard compression plate 162 compress the sealing devices, the sealing devices may expand in a radial direction (toward and away from shaft 102), thereby forming a seal with shaft 102. Inboard compression plate 160 and outboard compression plate 162 can be at least partially formed from a corrosion resistant material in various embodiments. For example, in various embodiments, shaft seal 100 can be configured to prevent solvents such as acetone or hexane from escaping from the bulk handing system to which shaft seal 100 is coupled. In instances such as this, inboard compression plate 160 and outboard compression plate 162 can be at least partially formed from a corrosion-resistant material, such as brass, stainless steel, aluminum, copper, bronze, or galvanized steel. However, it should be appreciated that the material of inboard compression plate 160 and outboard compression plate 162 could be selected based on the nature of the solvent used in connection with shaft seal 100. By selecting a corrosion resistant material such as brass, the life span of inboard compression plate 160 and outboard compression plate 162 may be increased.

In various embodiments, inboard compression plate 160 can include a substantially annular geometry, however, inboard compression plate 160 is not limited in this regard and can include any desired geometry. Inboard compression plate 160 can include an inboard face 164 and an outboard face 166 opposite inboard face 164. Inboard face 164 may be configured to mate with outboard face 150 of wear plate 148. Outboard face 166 of inboard compression plate 160 may be configured to mate with an inboard face of outboard compression plate 162 as will be described further below. Inboard compression plate 160 may further comprise a recess 168 extending in an inboard direction from outboard face 166. A recess plate 170 of inboard compression plate 160 may be used to provide compression from one side of the sealing devices as will be discussed further below. Inboard face 164 of inboard compression plate 160 can include an annular groove 172 (FIG. 2) configured to receive an inboard compression plate sealing ring 174 configured provide a redundant seal in addition to the sealing devices. In various embodiments, inboard compression plate sealing ring 174 can be at least partially formed from any suitable material or combination of materials, such as buna-nitrile, ethylene-propylene (EPDM), perfluoroelastomer (FFKM), fluorosilicone, neoprene/choroprene, polyurethane, silicone, fluorocarbon material or other suitable material. Inboard compression plate sealing ring 174 may be configured to form a seal with a radial outer surface of shaft 102. Additionally, in various embodiments, it will be appreciated that outboard compression plate sealing ring 174 can be of any suitable size, shape, configuration and/or construction. As a non-limiting example, outboard compression plate sealing ring 174 is shown and described herein as having an approximately circular cross-sectional shape, such as that of an otherwise conventional O-ring. It will be appreciated, however, that outboard compression plate sealing ring 174 is not intended to be limited in such a manner, and that any other suitable sealing ring can alternately be used (e.g., quad-rings, X-rings, square rings) without departing from the subject matter of the present disclosure.

Similarly, outboard compression plate 162 can include a substantially annular geometry, however, outboard compression plate 162 is not limited in this regard and may comprise any desired geometry. Outboard compression plate 162 may comprise an inboard face 176 and an outboard face 178 opposite inboard face 176. Inboard face 176 may be configured to mate with outboard face 166 of inboard compression plate 160. Outboard face 178 of outboard compression plate 162 may be configured with an inboard portion of outboard frame plate 116. Outboard compression plate 162 can further include a recess 180 extending in an outboard direction from inboard face 176. A recess plate 182 of outboard compression plate 162 may be used to provide compression from one side of the sealing devices as will be discussed further below. Outboard face 178 of outboard compression plate 162 can include an annular groove 184 (FIG. 2) configured to receive an outboard compression plate sealing ring 186 configured provide a redundant seal in addition to the sealing devices. In various embodiments, outboard compression plate sealing ring 186 can be at least partially formed from any suitable material or combination of materials, such as buna-nitrile, ethylene-propylene (EPDM), perfluoroelastomer (FFKM), fluorosilicone, neoprene/choroprene, polyurethane, silicone, fluorocarbon material or other suitable material. Outboard compression plate sealing ring 186 may be configured to form a seal with a radial outer surface of shaft 102. Additionally, in various embodiments, it will be appreciated that outboard compression plate sealing ring 186 can be of any suitable size, shape, configuration and/or construction. As a non-limiting example, outboard compression plate sealing ring 186 is shown and described herein as having an approximately circular cross-sectional shape, such as that of an otherwise conventional O-ring. It will be appreciated, however, that outboard compression plate sealing ring 186 is not intended to be limited in such a manner, and that any other suitable sealing ring can alternately be used (e.g., quad-rings, X-rings, square rings) without departing from the subject matter of the present disclosure.

In accordance with various embodiments, shaft seal 100 can further include one or more sealing devices 188. In various embodiments, shaft seal 100 can include at least three sealing devices, however, shaft seal 100 is not limited in this regard. In various embodiments, shaft seal 100 can include between one (1) and twelve (12) sealing devices 188. Sealing devices 188 can be at least partially formed from any suitable material or combination of materials, such as polytetrafluoroethylene, fluorinated ethylene propylene, polyvinylidene fluoride, ethylene tetrafluoroethylene, or other material. In various embodiments, sealing devices 188 are at least partially formed from a compressible material. For example, sealing devices 188 can be at least partially formed from any material or combination of materials capable of allowing the sealing devices to expand in a radial direction in response to an axial load.

In various embodiments, sealing devices 188 can be of any suitable size, shape and/or configuration. As a non-limiting example, sealing devices 188 can include an annular geometry including a radially inner diameter and a radially outer diameter. In response to an axial load resulting from, for example, inboard compression plate 160 and outboard compression plate 162 compressing sealing devices 188, the radially inner diameter of sealing devices 188 may decrease in size and the radially outer diameter of sealing devices 188 may increase in size. In this way, sealing devices 188 (which can include a radially inner diameter slightly larger than that of shaft 102), will form a seal with a radially outer surface of shaft 102. Further, sealing devices 188 will also form a seal with a radially inner recess surface 190 of inboard compression plate 160 and a radially inner recess surface 192 of outboard compression plate 162. In such a way, sealing devices 188 may form a seal at a radially inner surface and a radially outer surface to reduce the likelihood of leaks. Further, shaft seal 100 including more than one sealing device 188 in addition to inboard compression plate sealing ring 174 and outboard compression plate sealing ring 186 may have redundant sealing surfaces. For example, in the event that the sealing performance of one or more of inboard compression plate sealing ring 174, sealing devices 188, and/or outboard compression plate sealing ring 186 degrades, other seals will be maintained with shaft 102, thereby preventing or at least minimizing leaking and extending the overall life of shaft seal 100.

In various embodiments, it will be appreciated that that sealing devices 188 can be of any suitable size, shape, configuration and/or construction. As a non-limiting example, sealing devices 188 are shown and described herein as having an approximately square or rectangular cross-sectional shape, such as that of an otherwise conventional square-ring or packing-ring. It will be appreciated, however, that sealing devices 188 are not intended to be limited in such a manner, and that any other suitable sealing device configurations can alternately be used (e.g., quad-rings, X-rings, O-rings) without departing from the subject matter of the present disclosure.

Figure 4:
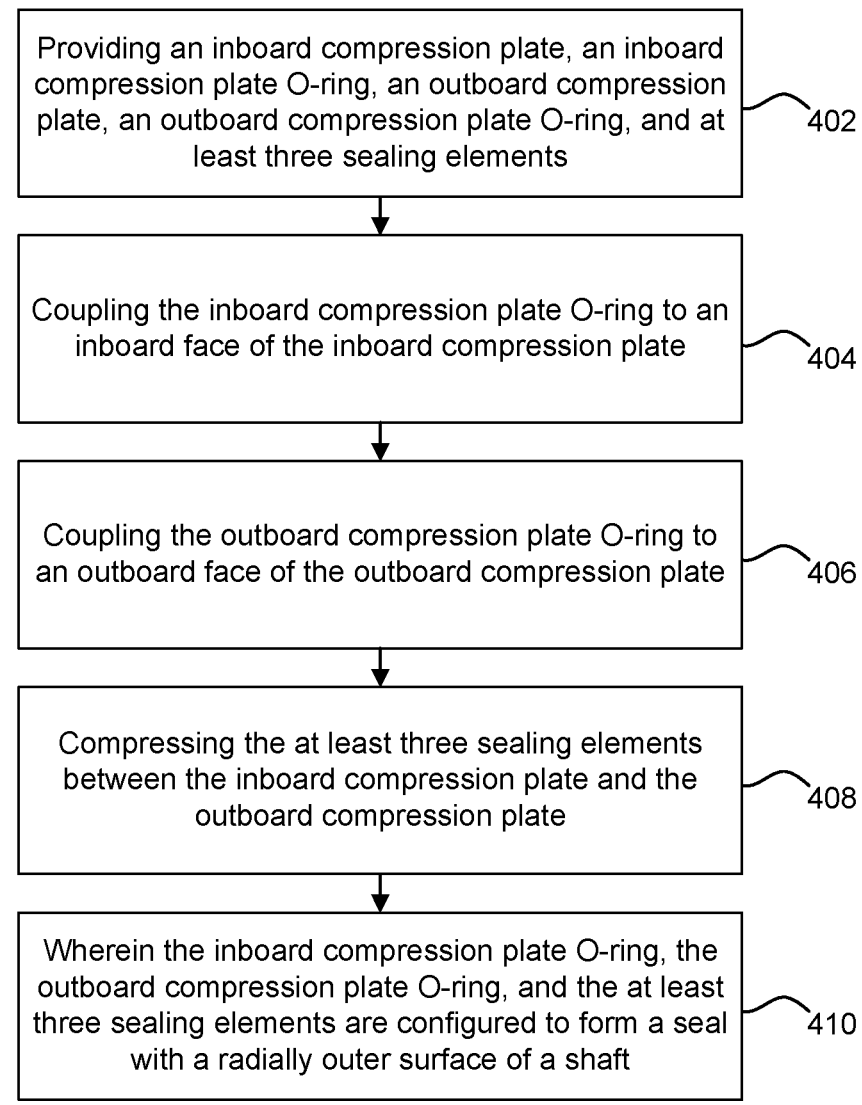

With reference to FIG. 4, a method 400 of assembling a shaft seal is illustrated in accordance with various embodiments of the present disclosure. The method can include providing an inboard compression plate, an inboard compression plate sealing ring, an outboard compression plate, an outboard compression plate sealing ring, and at least three sealing devices, such as is represented in FIG. 4 by reference number 402. The method can also include coupling the inboard compression plate sealing ring to an inboard face of the inboard compression plate, such as is represented in FIG. 4 by reference number 404. The method can further include coupling the outboard compression plate sealing ring to an outboard face of the outboard compression plate, such as is represented in FIG. 4 by reference number 406. The method can also include compressing the at least three sealing devices between the inboard compression plate and the outboard compression plate, such as is represented in FIG. 4 by reference number 408. The inboard compression plate sealing ring, the outboard compression plate sealing ring, and the at least three sealing devices may be configured to form a seal with a shaft, such as is represented in FIG. 4 by reference number 410.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus, it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

While the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. Equivalent changes, modifications and variations of various embodiments, materials, compositions and methods may be made within the scope of the present invention, with substantially similar results. The subject matter of the inventions includes all novel and non-obvious combinations and sub-combinations of the various elements, features, functions and/or properties disclosed herein.

Benefits, other advantages, and solutions to problems have been described herein with regard to specific embodiments. However, the benefits, advantages, solutions to problems, and any element or combination of elements that may cause any benefit, advantage, or solution to occur or become more pronounced are not to be construed as critical, required, or essential features or elements of any or all the claims of the invention. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

The invention claimed is:

1. A shaft seal for a screw conveyor, the shaft seal comprising:
   a housing including an outboard frame plate and an inboard frame plate with a shaft aperture extending axially therethrough;
   an outboard compression plate and an inboard compression plate situated between the outboard frame plate and the inboard frame plate;
   a wear plate inboard of the inboard compression plate, the wear plate configured to limit wear of the inboard frame plate, the wear plate having an outer diameter and including a wear pin aperture formed in the wear plate through the outer diameter thereof;
   a wear pin extending outboard from an inner surface of the inboard frame plate and into the wear pin aperture in the wear plate;
   an annular recess at least partially formed along at least one of the inboard compression plate and the outboard compression plate;

an inboard sealing device disposed between the inboard frame plate and the inboard compression plate along the shaft aperture;
an outboard sealing device disposed between the outboard frame plate and the outboard compression plate along the shaft aperture; and,
at least three intermediate sealing devices situated between the outboard compression plate and the inboard compression plate, the at least three intermediate sealing devices disposed within the annular recess with the inboard sealing device spaced axially inboard of the at least three intermediate sealing devices and the outboard sealing device space axially outboard of the at least three intermediate sealing devices such that the inboard sealing device and the outboard sealing device provide redundant seals along an associated shaft in addition to the at least three intermediate sealing devices.

2. A shaft seal according to claim 1, wherein the outboard compression plate and the inboard compression plate are at least partially formed from non-corrosive material.

3. A shaft seal according to claim 1, wherein at least one of the outboard compression plate and the inboard compression plate includes an annular groove configured to contain a corresponding one of the inboard sealing device and the outboard sealing device.

4. A screw conveyor comprising:
a shaft seal according to claim 1.

5. A screw conveyor according to claim 4 further comprising a shaft with a radially outer surface extending axially through the shaft aperture such that the inboard sealing device forms a seal along an axially-inboard portion of the radially outer surface, the outboard sealing device forms a seal along an axially-outboard portion of the radially outer surface, and the at least three intermediate sealing devices form a seal along an axially-intermediate portion of the radially outer surface.

6. A screw conveyor according to claim 4, wherein the shaft seal is coupled to a backplate via a plurality of fasteners.

7. A method of assembling a shaft seal, the method comprising:
providing an inboard compression plate and an outboard compression plate with one of the inboard compression plate and the outboard compression plate at least partially defining an annular recess;
positioning at least three sealing devices within the annular recess and situating the inboard compression plate, the outboard compression plate and the at least three sealing devices such that a shaft aperture extends axially therethrough;
positioning an inboard sealing device along the shaft aperture axially between the inboard compression plate and an inboard frame plate such that the inboard sealing device is spaced axially inboard of the at least three intermediate sealing devices;
positioning an outboard sealing device along the shaft aperture axially between the outboard compression plate and an outboard frame plate such that the outboard sealing device is spaced axially outboard of the at least three intermediate sealing devices;
positioning a wear plate between the inboard compression plate and the inboard frame plate such that the wear plate is operative to limit wear of the inboard frame plate, the wear plate having an outer diameter and including a wear pin aperture formed in the wear plate through the outer diameter thereof;
extending a wear pin outboard from an inner surface of the inboard frame plate and into the wear pin aperture in the wear plate thereby inhibiting rotational movement of the wear plate relative to the inboard frame plate; and,
compressing the at least three sealing devices between the inboard compression plate and the outboard compression plate, the inboard sealing device between the inboard compression plate and the inboard frame plate, and the outboard sealing device between the outboard compression plate and the outboard frame plate such that the inboard sealing device and the outboard sealing device provide redundant seals in addition to the at least three intermediate sealing devices along a shaft extending axially through the shaft aperture.

8. A method according to claim 7, wherein the inner surface of the inboard frame plate is a recess inner surface at least partially defining a frame plate recess within the inboard frame plate, and positioning the wear plate between the inboard compression plate and the inboard frame plate includes positioning the wear plate within the frame plate recess.

9. A method according to claim 8, wherein the wear plate includes an inboard surface and an outboard surface, and positioning the wear plate within the frame plate recess includes positioning the inboard surface of the wear plate in abutting engagement with the recess inner surface and the outboard surface of the wear plate in abutting engagement with the inboard compression plate.

10. A method according to claim 7, wherein the inner surface of the inboard frame plate is a recess inner surface at least partially defining an outboard-facing frame plate recess within the inboard frame plate, and the method further comprises positioning at least a portion of the inboard compression plate within the outboard-facing frame plate recess of the inboard frame plate.

11. A method according to claim 7 further comprising enclosing the inboard compression plate, the outboard compression plate, and the wear plate within a housing formed by the inboard frame plate and the outboard frame plate.

12. A screw conveyor comprising:
a backplate;
a rotatable shaft extending through the backplate and including a radially outer surface; and,
a shaft seal assembly secured along the backplate and sealingly engaging the rotatable shaft, the shaft seal assembly including:
an outboard frame plate and an inboard frame plate that together define a shaft aperture extending axially therethrough;
an outboard compression plate and an inboard compression plate situated between the outboard frame plate and the inboard frame plate;
a wear plate inboard of the inboard compression plate, the wear plate dimensioned to limit wear of the inboard frame plate, the wear plate having an outer diameter and including a wear pin aperture formed in the wear plate through the outer diameter thereof;
a wear pin extending outboard from an inner surface of the inboard frame plate and into the wear pin aperture in the wear plate;
an annular recess at least partially formed along at least one of the outboard compression plate and the inboard compression plate;
an inboard sealing device disposed between the inboard frame plate and the inboard compression plate along the shaft aperture;

an outboard sealing device disposed between the outboard frame plate and the outboard compression plate along the shaft aperture; and, at least three intermediate sealing devices situated between the outboard compression plate and the inboard compression plate, the at least three intermediate sealing devices disposed within the annular recess with the inboard sealing device and the outboard sealing device spaced axially away from the at least three intermediate sealing devices in directions opposite one another;

the rotatable shaft extending axially through the shaft aperture such that the inboard sealing device forms a seal along an axially-inboard portion of the radially outer surface, the outboard sealing device forms a seal along an axially-outboard portion of the radially outer surface, and the at least three intermediate sealing devices form a seal along an axially-intermediate portion of the radially outer surface with the inboard sealing device and the outboard sealing device forming redundant seals along the rotatable shaft in addition to the at least three intermediate sealing devices.

13. A screw conveyor according to claim 12 further comprising a housing at least partially enclosing the inboard compression plate and the outboard compression plate, the housing including the outboard frame plate and the inboard frame plate.

14. A screw conveyor according to claim 12, wherein the inner surface of the inboard frame plate is a recess inner surface that at least partially defines an outboard-facing frame plate recess within the inboard frame plate, and the wear plate is at least partially received within the outboard-facing frame plate recess.

15. A screw conveyor according to claim 14, wherein the wear plate includes an inboard surface and an outboard surface, and the wear plate is positioned within the outboard-facing frame plate recess in abutting engagement with the recess inner surface such that the outboard surface of the wear plate abuttingly engages the inboard compression plate.

16. A screw conveyor according to claim 13, wherein the inner surface of the inboard frame plate is a recess inner surface that at least partially defines an outboard-facing frame plate recess within the inboard frame plate, and at least a portion of the inboard compression plate is received within the outboard-facing frame plate recess of the inboard frame plate.

17. A screw conveyor according to claim 13, wherein the outboard frame plate includes a recess surface at least partially defining an inboard-facing frame plate recess within the outboard frame plate, and at least a portion of the outboard compression plate is received within the inboard-facing frame plate recess of the outboard frame plate.

18. A shaft seal according to claim 1, wherein the inner surface of the inboard frame plate is a recess inner surface that at least partially defines an outboard-facing frame plate recess within the inboard frame plate, and the wear plate is at least partially received within the outboard-facing frame plate recess.

19. A shaft seal according to claim 18, wherein at least a portion of the inboard compression plate is received within the outboard-facing frame plate recess of the inboard frame plate outboard of the wear plate.

20. A method according to claim 7, wherein the outboard frame plate includes a recess surface at least partially defining an inboard-facing frame plate recess within the outboard frame plate, and the method further comprises positioning at least a portion of the outboard compression plate within the inboard-facing frame plate recess of the outboard frame plate.

* * * * *